United States Patent
Li et al.

(10) Patent No.: US 7,580,461 B2
(45) Date of Patent: Aug. 25, 2009

(54) BARBELL LIFTING FOR WAVELET CODING

(75) Inventors: Shipeng Li, Redmond, WA (US); Ruiqin Xiong, Beijing (CN); Lin Luo, Hefei (CN); Jizheng Xu, Beijing (CN); Feng Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1031 days.

(21) Appl. No.: 10/911,836

(22) Filed: Aug. 4, 2004

(65) Prior Publication Data

US 2005/0190978 A1 Sep. 1, 2005

Related U.S. Application Data

(60) Provisional application No. 60/548,768, filed on Feb. 27, 2004.

(51) Int. Cl.
H04N 7/12 (2006.01)
H04N 11/02 (2006.01)
H04N 11/04 (2006.01)
G06K 9/36 (2006.01)
G06K 9/46 (2006.01)

(52) U.S. Cl. ............ 375/240.18; 375/240.01; 375/240.19; 382/239; 382/240

(58) Field of Classification Search ............ 375/240.01, 375/240.18, 240.19; 382/240
See application file for complete search history.

(56) References Cited

U.S. PATENT DOCUMENTS 5,692,063 A 11/1997 Lee et al.
5,946,043 A 8/1999 Lee et al.
5,982,438 A 11/1999 Lin et al.
6,233,017 B1 5/2001 Chaddha (Continued)

FOREIGN PATENT DOCUMENTS

WO WO2006006764 A1 1/2006
WO WO2006006778 A1 1/2006
WO WO2006059847 A1 6/2006

OTHER PUBLICATIONS

Mandal, Video Segmentation in the Wavelet Compressed Domain, Journal of Visual Communications and Image Representation, 2001, pp 12, 17-28.
Luo et al., "Layer-correlated Motion Estimation and Motion Vector Coding for the 3D-Wavelet Video Coding", IEEE 2003, Aug. 2003.

*Primary Examiner*—Marsha D Banks Harold
*Assistant Examiner*—Chikaodili E Anyikire
(74) *Attorney, Agent, or Firm*—Lee & Hayes, PLLC

(57) ABSTRACT

A method for encoding motion-compensated video data includes generating, for a current frame, a high-pass wavelet coefficient based on a function of pixels in a temporally adjacent frame. The operations are repeated for multiple pixels in an array of pixels in the current frame to form an array of high-pass wavelet coefficients. A low-pass wavelet coefficient is generated based on a function of the high-pass wavelet coefficients. A system for coding video data includes a temporal wavelet decomposition module decomposing a pixel into a high-pass coefficient by performing a discrete wavelet transform on the pixel, a function of pixels in a previous frame, and/or a function of pixels in a subsequent frame. The system includes a motion estimation module generating motion vectors associated with the pixels in the previous frame and in the subsequent frame.

27 Claims, 15 Drawing Sheets

U.S. PATENT DOCUMENTS

| | | |
|---|---|---|
| 6,404,814 B1 | 6/2002 | Apostolopoulos et al. |
| 6,470,469 B1 | 10/2002 | Chou et al. |
| 6,510,177 B1 | 1/2003 | De Bonet et al. |
| 6,546,143 B1 | 4/2003 | Taubman et al. |
| 6,597,739 B1 | 7/2003 | Li et al. |
| 6,678,419 B1 | 1/2004 | Malvar |
| 6,700,933 B1 | 3/2004 | Wu et al. |
| 6,735,345 B2 | 5/2004 | Lin et al. |
| 7,027,512 B2 | 4/2006 | Jeon |
| 2003/0128760 A1 | 7/2003 | Lee et al. |
| 2003/0133500 A1 | 7/2003 | Auwera et al. |
| 2005/0047509 A1 | 3/2005 | Lee et al. |
| 2005/0117639 A1* | 6/2005 | Turaga et al. .......... 375/240.01 |
| 2005/0117647 A1 | 6/2005 | Han |
| 2006/0012680 A1 | 1/2006 | Bourge |
| 2007/0253487 A1 | 11/2007 | Kim et al. |

* cited by examiner

BARBELL LIFTING FOR WAVELET CODING

RELATED APPLICATIONS

This application claims priority to U.S. Provisional Application No. 60/548,768, filed Feb. 27, 2004.

TECHNICAL FIELD

The described subject matter relates to video encoding, and more particularly to Barbell lifting for wavelet coding.

BACKGROUND

In the field of video coding, video images or frames can be coded into wavelet coefficients. Such wavelet encoding can offer good coding efficiency. Traditional approaches to wavelet coding involve applying a 1-dimensional (1-D) wavelet transformation to a video image to decompose the image data into the coefficients that represent the video image. The decomposing process is often referred to as lifting. The wavelet coefficients can be used by a video receiver to easily reconstruct the video image. Unfortunately, traditional approaches to wavelet coding have drawbacks, particularly with respect to motion video coding.

Some video coding standards, such as MPEG-4, employ motion compensation. Generally, motion compensation involves creating motion vectors that indicate how areas (called macroblocks) of frames in motion video move from one frame to another frame. By using motion vectors, redundancy between frames can be exploited to increase video compression. Using motion vector information, the video receiver can determine where pixels move from one frame to the next.

One problem that can arise when applying wavelet coding to motion compensated video is called over-complete wavelet compensation. Over-complete wavelet compensation occurs when motion vectors collide due to contractive motion. When motion vectors collide, multiple pixels in one frame may be mapped to one pixel in a subsequent frame. FIG. 1 is a graphical illustration 100 depicting over-complete wavelet compensation. 1-dimensional pixel arrays 102 are shown in a sequence of temporally-related frames 104. As shown, three motion vectors 106a, 106b, and 106c converge on a single pixel 108 in frame $F_2$. One possible solution to colliding motion vectors is to remove all but one of the colliding vectors. In FIG. 1, removal of motion vectors 106a and 106c is illustrated with an 'X' 110 over motion vector 106a and an 'X' 112 over motion vector 106c. However, this solution results in significant reduction of coding efficiency due to the wavelet boundary effect.

Another problem that can occur when wavelet coding motion video relates to fractional pixel (or sub-pixel) precision. Traditionally, when a motion vector indicates that a pixel of one frame has moved between two pixel positions of a subsequent frame, the pixel position is set to one or the other of the two pixel positions in the subsequent frame. In other words, the fractional pixel position motion vector is forced to an integer pixel position. Inaccuracy related to fractional pixels is illustrated in FIG. 1. A motion vector 114 (shown with a dotted line) originally points between two pixel position 116 and pixel position 118. The motion vector 114 is adjusted to a new motion vector 120 that points to pixel position 116. If, in forcing a sub-pixel to an integer pixel position, over-complete wavelet compensation occurs, the sub-pixel may be forced to a different, less accurate integer pixel position. As a result, coding accuracy and efficiency may be reduced.

Accordingly, although wavelet coding of images can be beneficial to improve coding efficiency, traditional approaches to wavelet coding has certain drawbacks when applied to motion video.

SUMMARY

Implementations relate to Barbell lifting for wavelet-based video coding to address the aforementioned problems, as well as other problems. Barbell lifting involves applying a wavelet transform in a predictive stage to generate high-pass coefficients and in an update stage to generate low-pass coefficients. The wavelet transform includes functions of sets of pixels in adjacent frames to generate wavelet coefficients. The functions can be of any form, so as to improve motion alignment, multiple-to-one pixel mapping, or fractional pixel mapping. Block-size used in the wavelet transform can be adapted to regions in a frame.

DESCRIPTION

Exemplary Video Coding System

Figure 1:
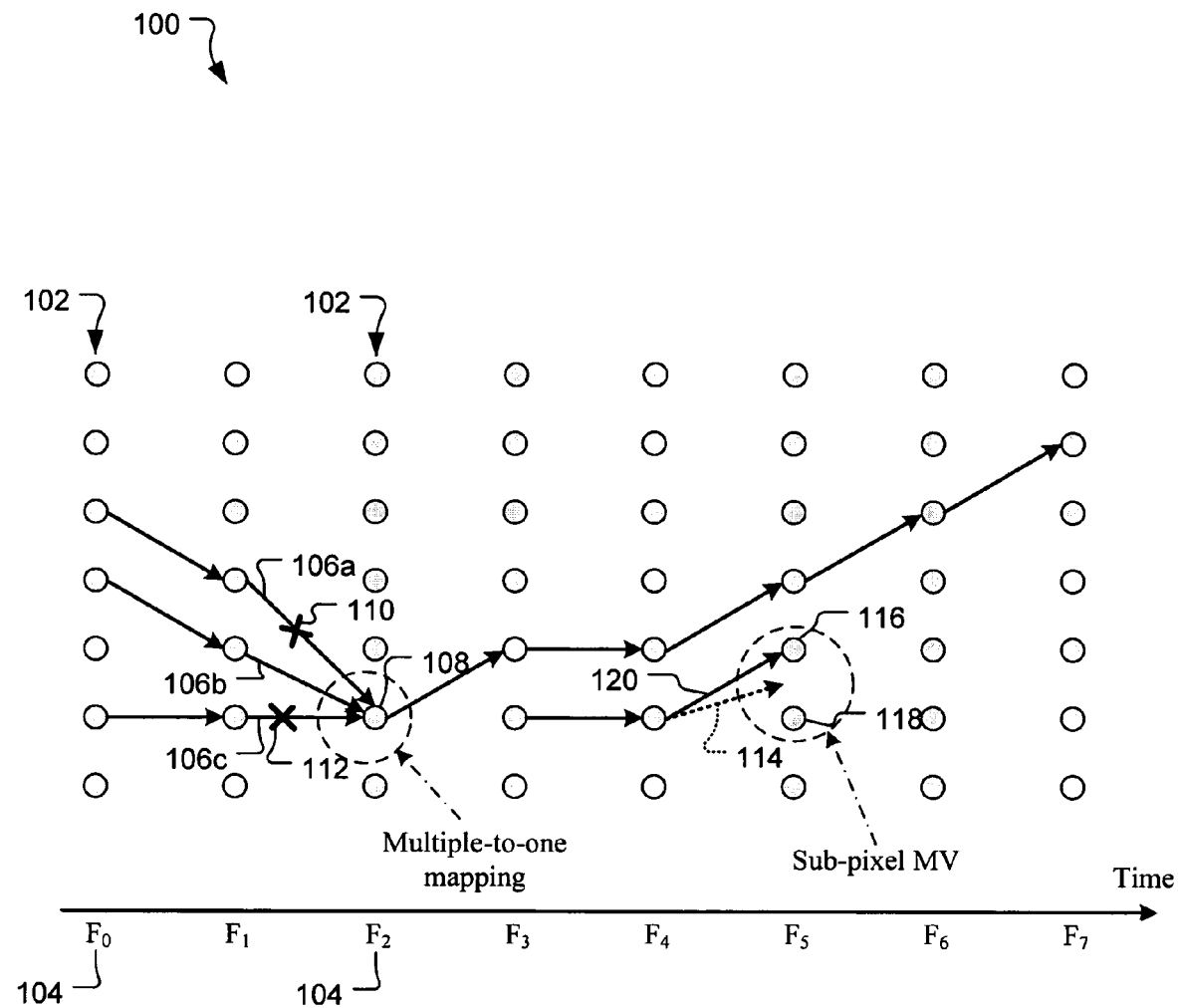
FIG. 1 is a graphical illustration of multiple-to-one pixel mapping and fractional pixel mapping that can occur in wavelet coded motion-compensated video.
Figure 2:
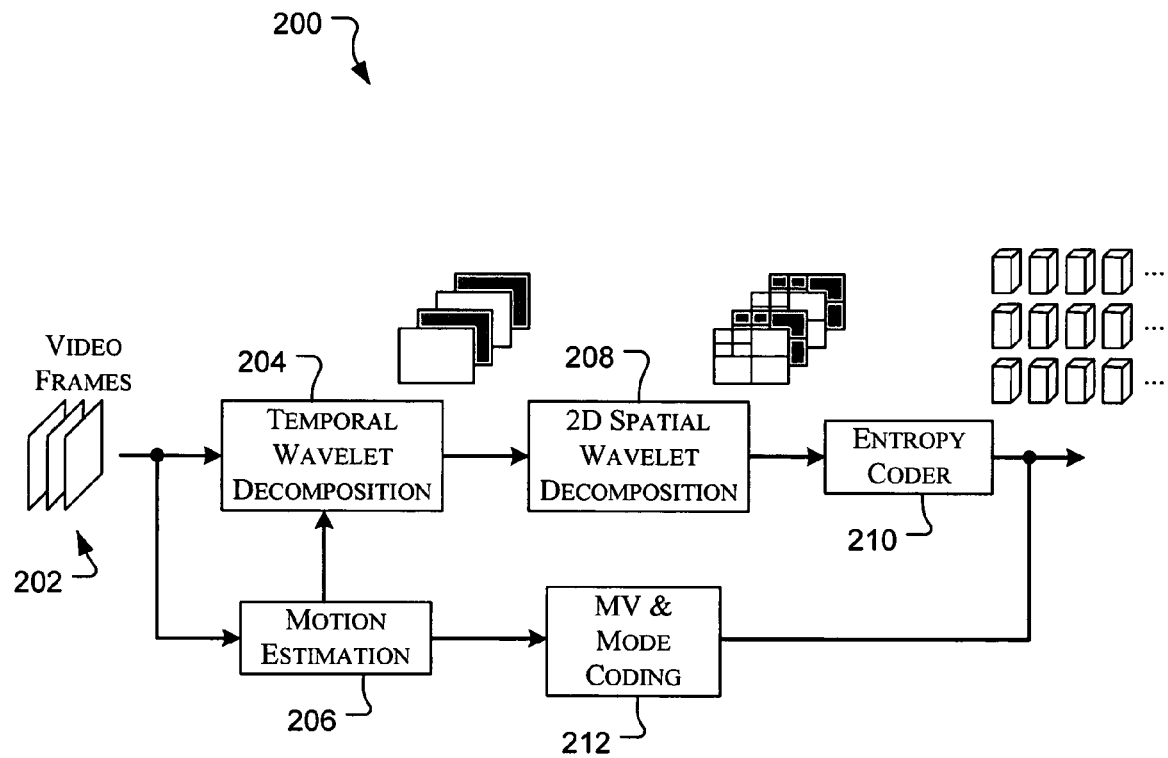
FIG. 2 illustrates an exemplary video coder employing temporal wavelet decomposition, wherein Barbell lifting is applied with motion compensation.

FIG. 2 illustrates an exemplary video coder 200 employing Barbell functions for coding video data using motion alignment 3-dimensional wavelet coding. The video coder 200 exploits temporal and spatial correlation among input video frames 202 using wavelet decomposition. The video coder 200 also employs motion estimation for estimating motion of pixels across the frames 202.

Initially, the video frames 202 are input into a temporal wavelet decomposition module 204 and a motion estimation module 206. The temporal wavelet decomposition module 204 decomposes pixels in the video frames 202 into wavelet coefficients that represent the video frames 202. The temporal wavelet decomposition module 204 employs a wavelet transform, which performs a wavelet lifting process. The wavelet coefficients include low-pass and high-pass coefficients, which are described in further detail below. The output of the temporal wavelet decomposition module 204 includes frames of wavelet coefficients. The frames output from the temporal wavelet decomposition module 204 alternate between a frame of low-pass coefficients and a frame of high-pass coefficients.

The motion estimation module 206 uses pixel information from the input frames 202 to perform motion alignment. In MPEG-4, for example, the frames 202 are each composed of macroblocks. A macroblock is a region in the frames 202 used for motion alignment. For example, in some standards, each macroblock consists of a 16×16 array of pixels. The motion estimation module 206 generates motion vector(s) that represent the horizontal and vertical displacement from the macroblock being encoded to the matching macroblock-sized area in a reference frame.

The motion vector(s) from the motion estimation module 206 can be used by the temporal decomposition module 204 to generate the wavelet coefficients. Because the motion alignment is performed during the temporal wavelet decomposition, the temporal wavelet decomposition module 204 can effectively form high energy compactions using the motion alignment information.

The frames output by the temporal wavelet decomposition module 204 are input into a 2-dimensional (2-D) spatial wavelet decomposition module 208. The spatial wavelet decomposition module 208 takes advantage of spatial correlation of pixels within a frame. The spatial wavelet decomposition module 208 decomposes each input frame into wavelet coefficients in both the vertical and the horizontal dimensions. The temporal wavelet decomposition module 204 and the 2-D spatial wavelet decomposition module 208 use discrete wavelet transforms (DWTs) to generate wavelet coefficients.

An entropy coder 210 provides for further compression of the video data prior to transmission. The entropy coder 210 assigns codes to symbols in the frames output by the spatial decomposition module 208 so as the match code lengths with the probabilities of the symbols. Typically, the entropy coder 210 assigns the most common symbols to the shortest codes using an algorithm. Exemplary entropy coding algorithms include Fibonacci coding, Golomb coding, Rice coding, Huffman coding, or Range coding.

A motion vector (MV) and mode coding module 212 code MV information and mode information into the signal that is transmitted. Mode information describes the predicted direction and/or macroblock partition of a current macroblock. The predicted direction is based on whether the current macroblock is predicted from a previous reference, a future reference or both. Macroblock partition indicates whether the current macroblock is further partitioned into multiple sub-blocks, wherein each sub-block has a motion vector. A video decoder (not shown) that receives the transmitted signal uses the entropy coded, wavelet decomposed frames, and the MV and mode information to reconstruct the video frames. Generally, reconstruction of the video frames includes the reverse of the processes employed by the video coder 200.

The video coder 200 may be implemented in software, firmware, and/or hardware. The video coder 200 may be constructed as part of a general purpose computer (e.g., the computing device shown in FIG. 15) or special purpose computer (e.g., an embedded system), where the video code can be incorporated into an operating system or other application programs. Various exemplary implementations of processes employed by the video coder 220 are illustrated and described in further detail below with regard to the following figures.

Figure 3:
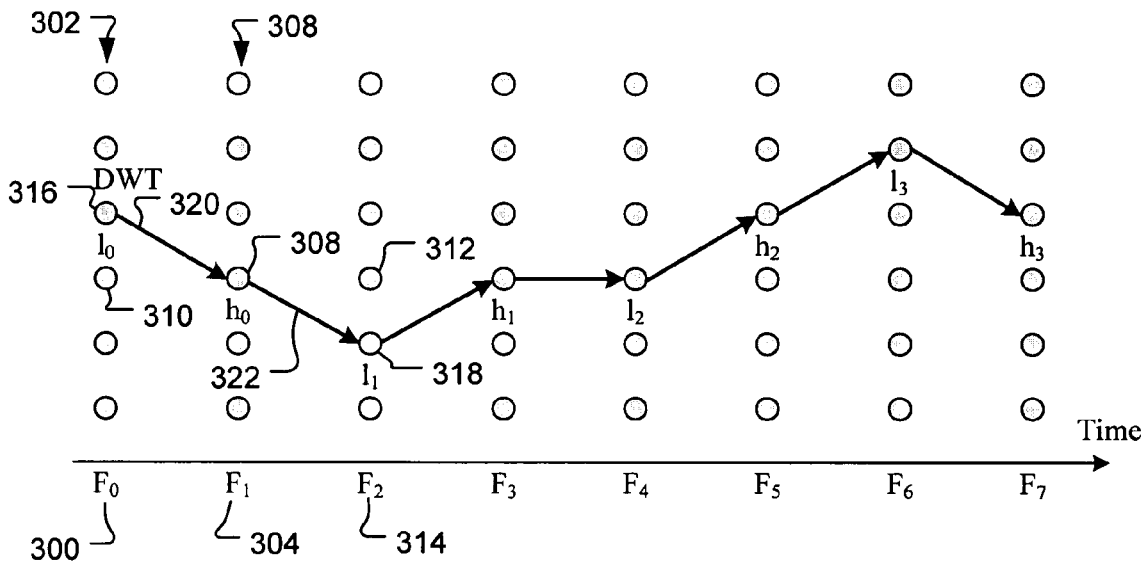
FIG. 3 is a graphical illustration of motion aligned wavelet coefficients in a sequence of video frames.

FIG. 3 graphically illustrates motion alignment with temporal wavelet decomposition. In an actual implementation, a decomposed frame of video is a 2-Dimensional (2-D) wavelet coefficient array. The systems and operations described herein can be applied to 2-D arrays of any size. However, for ease of illustration, each frame in a sequence of video frames is shown in FIG. 3 as a one-dimensional (1-D) wavelet coefficient array. The frames alternate between a low-pass frame and a high-pass frame. For example, frame $F_0$ 300 includes an array 302 of low-pass coefficients, frame $F_1$ 304 includes an array 306 of high-pass coefficients, and so on. $l_0, l_1, \ldots, l_3$ in FIG. 3 denotes the low-pass coefficients after wavelet decomposition and $h_0, h_1, \ldots, h_3$ denotes the high-pass coefficients.

The coefficients are not necessarily determined by coefficients at the same location of adjacent frames. For example, high-pass coefficient $h_0$ 308 in $F_1$ 304 is not calculated from the collocated coefficients 310 and 312 in $F_0$ 300 and $F_2$ 314, respectively. Instead, after motion alignment, coefficient $h_0$ 308 is decomposed as a high-pass coefficient based on coefficients 316 and 318 of $F_0$ 300 and $F_2$ 314 specified by backward motion vector (MV) 320 and forward MV 322, respectively. Other coefficients are processed in a similar fashion.

Figure 4:
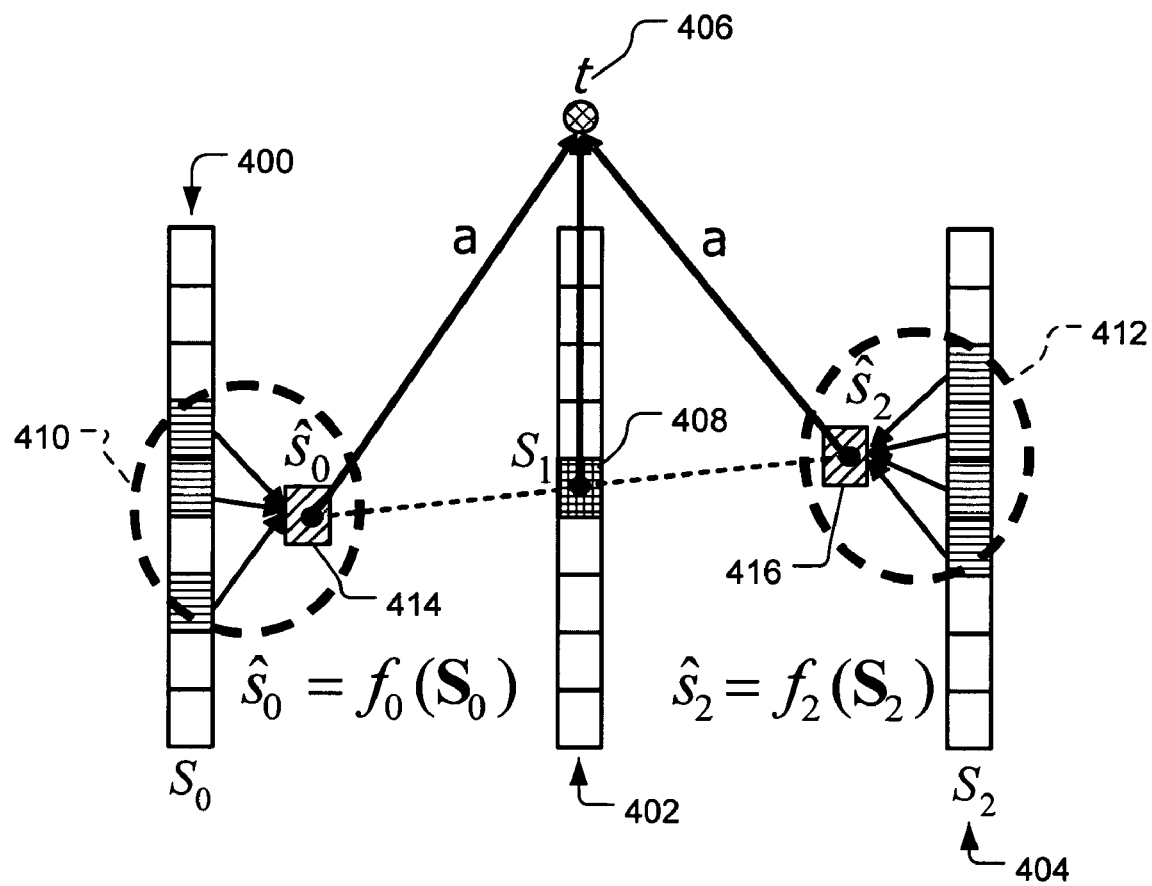
FIG. 4 illustrates an wavelet coding scheme with Barbell lifting wherein a wavelet coefficient is generated for a current frame based on multiple pixels from adjacent frames.

FIG. 4 graphically illustrates a wavelet coding scheme with Barbell lifting for coding video data. The coding scheme illustrated in FIG. 4 can be carried out by the temporal wavelet decomposition module 204 (FIG. 2). For an n-dimensional (i.e., multi-dimensional) signal, such as video and images, the scheme illustrated in FIG. 4 provides for efficient 1-D wavelet decomposition by taking one or more pixels from adjacent frames. Therefore, the wavelet lifting scheme is referred to herein as 'barbell lifting'.

FIG. 4 illustrates three one-dimensional pixel arrays to which Barbell lifting can be applied: a first pixel array 400, a second pixel array 402, and a third pixel array 404. The first pixel array 400 and the third pixel array 404 are in frames of video that are temporally adjacent to a frame that includes the second pixel array 402. A wavelet coefficient 406, labeled 't', is generated that corresponds to a pixel 408, labeled $S_1$, in the second pixel array 402.

In one implementation of Barbell lifting pixel $s_1$, and a barbell function of pixels from the first pixel array 400 and the second pixel array 404, are used to generate the coefficient t 406. To illustrate, a first group of pixels 410, labeled $S_0$, is shown with hatch lines in the first pixel array 400. A second group of pixels 412, labeled $S_2$, is shown with hatch lines in the second pixel array 404. In a special case, either or both of the groups 410 and 412 do not include any pixels. In other cases, groups 410 and 412 include one or more pixels.

The pixels in the first group 410 are combined to create another pixel, referred to herein as a combopixel 414, labeled $\hat{s}_0$. Similarly, the pixels in the second group 412 are combined to create another combopixel 416, labeled $\hat{s}_2$. Combopixel $\hat{s}_0$ 414 is derived according to a function of the pixels in the first group 410. As illustrated, the function used to derive combopixel $\hat{s}_0$ 414 is $f_0(S_0)$. The function used to derive combopixel $\hat{s}_2$ 416 is $f_2(S_2)$.

Functions $f_0(S_0)$ and $f_2(S_2)$ are called barbell functions. Functions $f_0(S_0)$ and $f_2(S_2)$ can be any linear or non-linear functions that operate on any pixels in the associated frames. A barbell function, such as $f_0(S_0)$, can also vary from pixel to pixel within a frame.

The wavelet coefficient 406 is computed in the barbell lifting process in accordance with a discrete wavelet transform. Accordingly, the barbell lifting process is formulated with the general function shown in equation (1):

$$t = a \times \hat{s}_0 + s_1 + b \times \hat{s}_2 \qquad (1)$$

The values 'a' and 'b' are the filtering parameters of wavelet transform. The values 'a' and 'b' may or may not be equal. Typically, the barbell lifting process is applied in two stages. The first stage, called a prediction stage, generates high-pass coefficients and the second stage, called and update stage, generates low-pass coefficients.

To illustrate barbell lifting further, a specific example is described with reference to FIGS. 5-8. The example illustrates both the wavelet transform and inverse wavelet transform. In FIGS. 5-8, a pixel is denoted by letter 'x', a 1-D array of pixels is denoted by letter 'X', a low-pass coefficient is denoted by letter 'l', a 1-D array of low-pass coefficients is denoted by letter 'L', a high-pass coefficient is denoted by 'h', and a 1-D array of high-pass coefficients is denoted by letter 'H'. Although the example illustrates only 1-D pixel and coefficient arrays, it is to be understood that the barbell lifting process is typically applied across an entire 2-D frame to generate a frame of coefficients.

Figure 5:
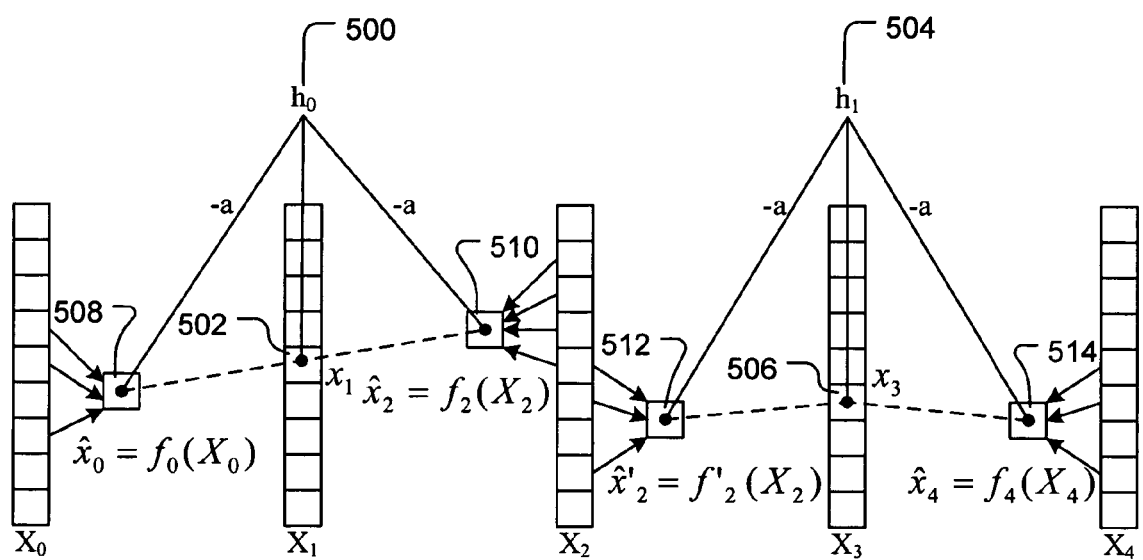
FIG. 5 illustrates an example of high-pass wavelet coefficient generation using Barbell lifting in a prediction stage.

First, as shown in FIG. 5, the prediction stage takes original input video frames to generate high-pass frames. Each of the 1-D pixel arrays, $X_0, X_1, \ldots, X_4$, is an array from a corresponding frame in a sequence of frames. In the prediction stage, high-pass frames are generated for each pixel in every other frame. Thus, a high-pass coefficient $h_0$ 500 is generated that corresponds to pixel $x_1$ 502 in array $X_1$, and another high-pass coefficient $h_1$ 504 is generated that corresponds to pixel $x_3$ 506 in array $X_3$.

The high-pass coefficient $h_0$ 500 is a wavelet transform of a combopixel $\hat{x}_0$ 508 from the previous frame and combopixel $\hat{x}_2$ 510 from the subsequent frame. As shown, combopixel $\hat{x}_0$ 508 is computed from a barbell function, $f_0(X_0)$, which is a function of a group of pixels in the 1-D array $X_0$. Also as shown, combopixel $\hat{x}_2$ 510 is computed from a barbell function, $f_2(X_2)$, which is a function of a group of pixels in the 1-D array $X_2$.

A similar process is used to compute high-pass coefficient $h_1$ 504. High-pass coefficient $h_1$ 504 is a function of combopixel $\hat{x}'_2$ 512 from the previous adjacent frame and combopixel $\hat{x}_4$ 514 from the subsequent adjacent frame. As shown, combopixel $\hat{x}'_2$ 512 is computed from a barbell function, $f'_2(X_2)$, which is a function of a group of pixels in the 1-D array $X_2$. Also as shown, combopixel $\hat{x}_4$ 514 is computed from a barbell function, $f_4(X_4)$, which is a function of a group of pixels in the 1-D array $X_3$. It is important to note that the group of pixels used in barbell function $f_2(X_2)$ can be different from the group of pixels used in the barbell function $f'_2(X_2)$.

A 1-D high-pass coefficient array, $H_0$, is generated by creating a high-pass coefficient for each pixel in pixel array $X_1$. High-pass coefficient array $H_0$ can be represented by $[h_{00}, h_{01}, \ldots, h_{0n}]$. Another 1-D high-pass coefficient array, $H_1$, is generated by creating a high-pass coefficient for each pixel in pixel array $X_3$. High-pass coefficient array $H_1$ can be represented by $[h_{10}, h_{11}, \ldots, h_{1n}]$. The high-pass coefficients are used in the update stage to generate low-pass coefficient arrays. An exemplary update stage is described with respect to FIG. 6.

Figure 6:
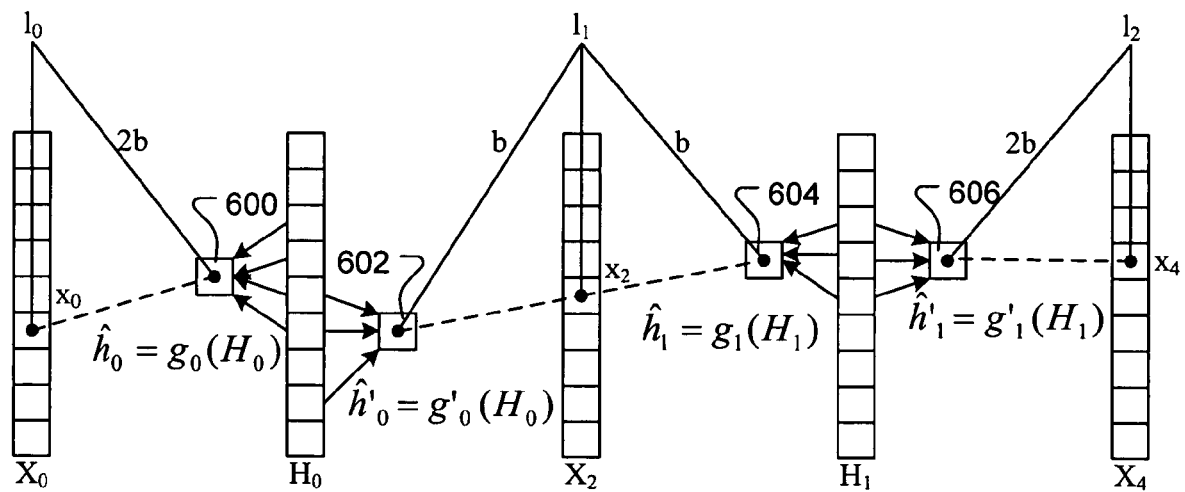
FIG. 6 illustrates an example of low-pass wavelet coefficient generation using Barbell lifting in an update stage.

FIG. 6 illustrates 1-D pixel frames $X_0$, $X_3$, and $X_4$, as in FIG. 5. However, 1-D high-pass array $H_0$ and 1-D high-pass array $H_1$ are shown in place of 1-D pixel array $X_1$ and 1-D pixel array $X_3$, respectively. 1-D low-pass coefficient arrays $L_0$, $L_1$, and $L_2$ are generated for 1-D pixel frames $X_0$, $X_2$, and $X_4$, respectively.

As illustrated in FIG. 6, a low-pass coefficient, $l_0$, corresponding to pixel $x_0$ is based on the pixel $x_0$ and a group of high-pass coefficients from the 1-D high-pass coefficient array $H_0$. The group of high-pass coefficients are combined to form a value $\hat{h}_0$, referred to herein as a combo-coefficient 600. The combo-coefficient is derived from function $g_0(H_0)$, which operates on the group of high-pass coefficients from 1-D coefficient array $H_0$. Low-pass coefficient, $l_0$, can be derived from the following wavelet transform:

$$l_0 = x_0 + 2b \times \hat{h}_0 \qquad (2)$$

Low-pass coefficient array $L_1$ is derived in a similar fashion, using groups of high-pass coefficients from high-pass coefficient array $H_0$ and high-pass coefficient array $H_1$, as well as the pixels in pixel array $X_2$. For example, a combo-coefficient $\hat{h}'_0$ 602 is computed from barbell function $g'_1(H_0)$, and combo-coefficient $\hat{h}_1$ 604 is computed from barbell function $g_1(H_1)$. The low-pass coefficient $l_1$ can be specified by wavelet transform (3):

$$l_1 = b \times \hat{h}'_0 + x_2 + b \times \hat{h}_1 \qquad (3)$$

A similar process is used to generate low-pass coefficients in low-pass coefficient array $L_2$ using a high-pass combo-coefficient $\hat{h}'_1$ 606 and pixel $x_4$. As shown, combo-coefficient $\hat{h}'_1$ 606 is the result of function $g'_1(H_1)$.

Figure 7:
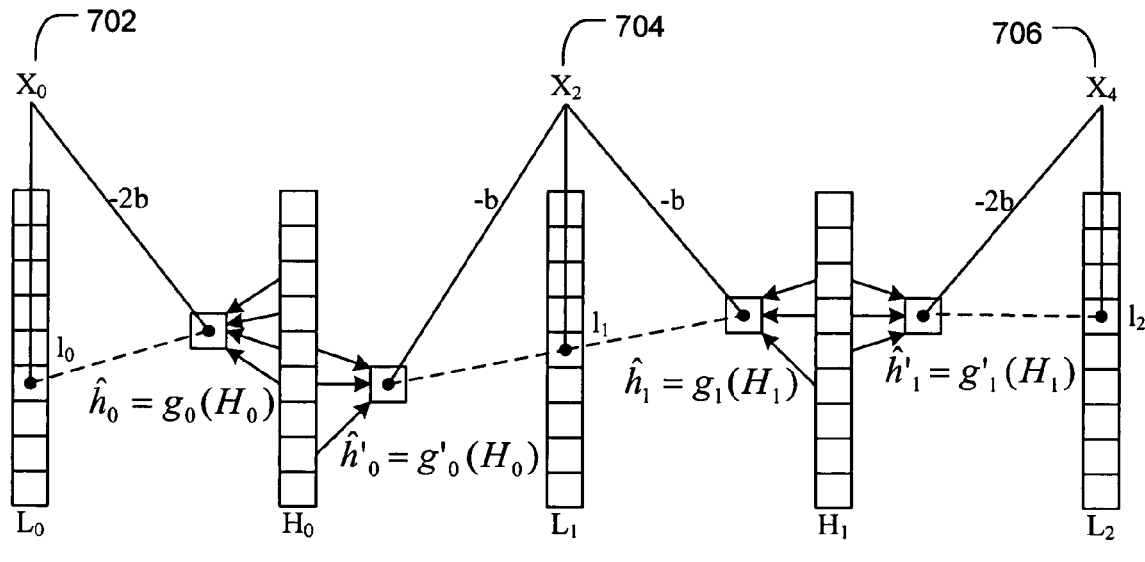
FIG. 7 illustrates an exemplary decoding process wherein frames of high-pass and low-pass wavelet coefficients are decoded to yield even frames of decoded pixels.
Figure 8:
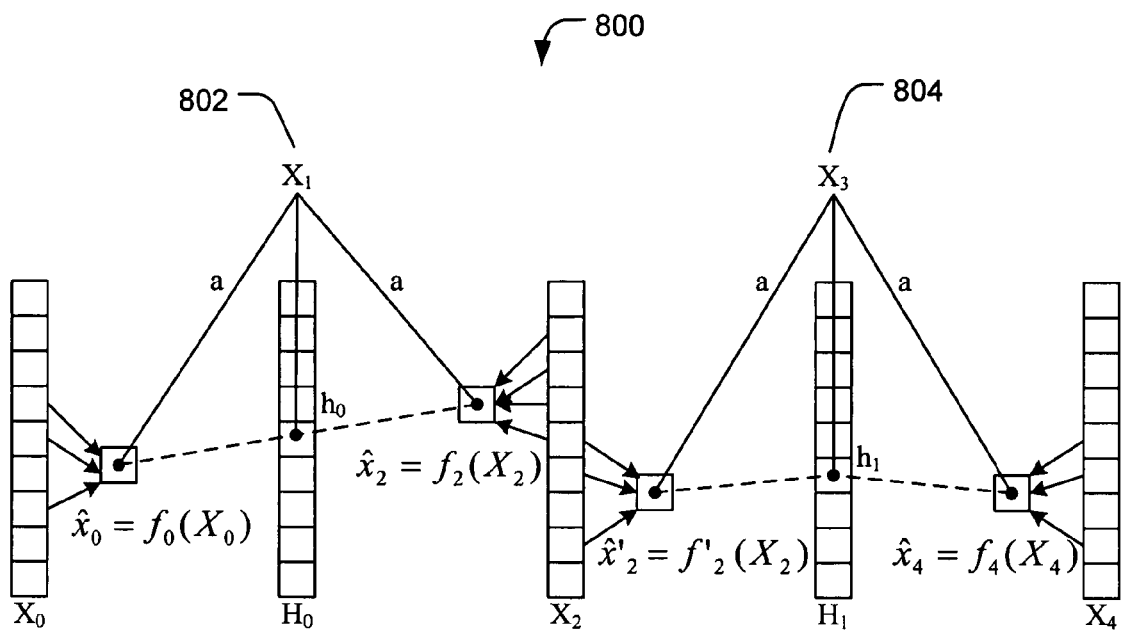
FIG. 8 illustrates an exemplary decoding process wherein the even frames of decoded pixels and the frames of high-pass wavelet coefficients are decoded to yield odd frames of decoded pixels.

After the prediction stage creates frames of high-pass coefficients and the update stage creates frames of low-pass coefficients, the high-pass and low-pass coefficient frames are transmitted to a video receiver. The video receiver uses a decoder to decode the wavelet coefficient data. The process of decoding is typically an inverse process. FIGS. 7-8 illustrate the inverse of the barbell lifting process.

For the inverse transform, as long as the original barbell functions used at the update stage are known, the even frames can be recovered first with available high-pass and low-pass frames as shown in FIG. 7. If the barbell functions at the prediction stage are known, the odd frames can be reconstructed with the available even frames and high-pass frames as shown in FIG. 8.

Referring specifically to FIG. 7, a sequence 700 of coded 1-D coefficient arrays $L_0$, $H_0$, $L_1$, $H_1$, and $L_2$ are used to generate decoded video arrays. In a first step of the decoding process, 1-D pixel arrays $X_0$ (702), $X_2$ (704), and $X_4$ (706) corresponding to even numbered video frames are generated. Thus, as shown 1-D pixel arrays $X_0$ (702), $X_2$ (704), and $X_4$ correspond to low-pass coefficient arrays $L_0$, $L_1$, and $L_2$, respectively. The process of generating 1-D pixel arrays $X_0$ (702), $X_2$ (704), and $X_4$ (706) is substantially inverse of the process illustrated in FIG. 6. Generally, a pixel in one of the pixel arrays $X_0$ (702), $X_2$ (704), and $X_4$ (706) is generated from an inverse wavelet transform of a combination of high-pass coefficient in an adjacent array, and a low-pass coefficient in the corresponding low-pass coefficient array.

For example, as shown, pixels in the pixel array X0 (702) is a combination of a low-pass coefficient, $l_0$, from coefficient array $L_0$ and high-pass coefficients from coefficient array $H_0$.

Generating a pixel, $x_0$, in 1-D array $X_0$ can be generalized by equation (4) below:

$$x_0 = l_0 + (-2b) \times \hbar_0 \qquad (4)$$

In equation (4), the value $\hbar_0$ is equal to function $g_0(H_0)$, which is a barbell function of one or more coefficients in coefficient array $H_0$. Pixels in pixel arrays $X_2$ (704) and $X_4$ (706) are generated in a similar manner to complete the pixel arrays. In this manner, the even video frames are generated by the decoder.

Referring to FIG. 8, there is shown a process 800 for generating the odd numbered video frames by decoding the remaining wavelet coded frames. The previously generated even numbered 1-D pixel arrays $X_0$, $X_2$, and $X_4$ are shown adjacent the high-pass coefficient arrays $H_0$ and $H_1$. Pixel arrays $X_1$ (802) and $X_3$ (804) correspond to odd numbered video frames and the high-pass coefficient arrays $H_0$ and $H_1$. Each pixel in the arrays $X_1$ (802) and $X_3$ (804) are generated by applying an inverse wavelet transform to a combination of pixels in adjacent decoded pixel arrays (e.g., pixel array $X_0$, $X_2$, or $X_4$) and a corresponding high-pass coefficient.

For example, a pixel, $x_1$, in array $X_1$ (802) is generated from a combination of pixels in array $X_0$, a combination of pixels in $X_2$, and high-pass coefficient $h_0$ in array $H_0$. A wavelet transform that describes pixel $x_1$ is given in equation (5) below:

$$x_1 = a \times \hat{x}_0 + h_0 + a \times \hat{x}_2 \qquad (5)$$

In equation (5), the value $\hat{x}_0$ is equal to function $f_0(X_0)$, which is a function of one or more pixels in array $X_0$. The value $\hat{x}_2$ is equal to function $f_2(X_2)$, which is a function of one or more pixels in array $X_2$. The pixel array $X_3$ (804) can be generated in a similar fashion. Using the decoding scheme shown in FIG. 8, the odd frames of the video can be generated.

Exemplary Barbell Functions

Barbell function can be any arbitrary functions. However, some barbell functions are more efficient for temporal decomposition. When choosing a barbell function, the high-pass coefficients are preferably close to zero for efficient energy packing. The low-pass coefficients are preferably free from ghosting artifacts for temporal scalability and subsequent spatial decomposition. The barbell function preferably follows the motion trajectory for efficient decomposition and efficient coding of the barbell functions. The barbell functions are preferably consistent in the prediction and update stages. Preferably the decomposition efficiency and the side information are balanced. Lastly, a barbell function is preferably able to distribute quantization errors among many coefficients, instead of accumulating the errors to only a few coefficients. The foregoing guidelines are only suggestions and are not required in designing barbell functions.

Figure 9:
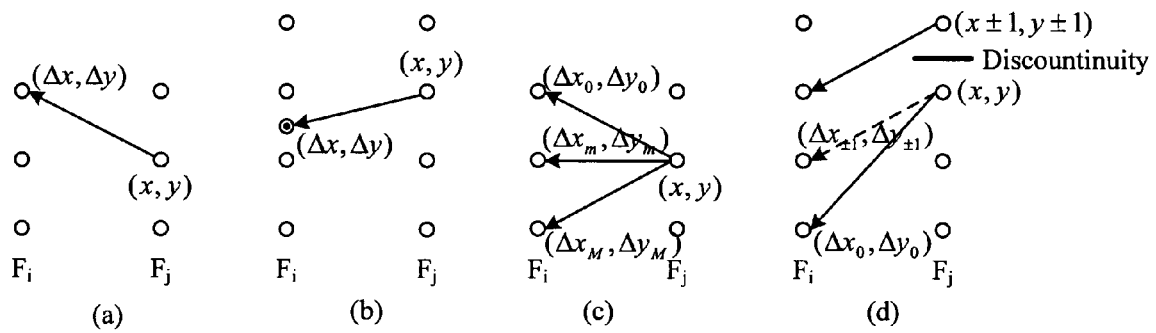
FIG. 9 illustrates four scenarios involving motion alignment and motion prediction when motion vectors are used in conjunction with barbell functions.

According to the above principles, many motion prediction techniques can be used to form efficient barbell functions. FIG. 9 illustrates some example scenarios in which barbell functions can be effectively used with motion vectors in the prediction stage. An integer motion alignment scenario is shown in FIG. 9(*a*). An exemplary barbell function associated with the integer motion alignment scenario is given as follows:

$$f = F_i(x + \Delta x, y + \Delta y) \qquad (6)$$

In equation (6), ($\Delta x$, $\Delta y$) represents the motion vector of a current pixel (x, y). The symbol $F_i$ denotes the previous frame and symbol $F_j$ denotes the current frame.

A fractional-pixel motion alignment scenario is shown in FIG. 9(*b*). An exemplary barbell function for the fractional-pixel motion alignment scenario is shown in equation (7):

$$f = \sum_m \sum_n \alpha(m, n) F_i(x + \lfloor \Delta x \rfloor + m, y + \lfloor \Delta y \rfloor + n) \qquad (7)$$

In equation (7), the symbol $\lfloor \ \rfloor$ denotes the integer part of $\Delta x$ and $\Delta y$. The barbell function specified in equation (7) yields a fractional pixel value calculated from neighboring pixels at integer pixel positions using an interpolation filter. The value $\alpha(m,n)$ is a factor of the interpolation filter at each pixel identified by indices m and n.

A multiple-to-one pixel mapping scenario is shown as in FIG. 9(*c*). An exemplary barbell function associated with the multiple-to-one pixel mapping scenario is shown in equation (8):

$$f = \sum_m \sum_n \alpha(m, n) F_i(x + \Delta x_m, y + \Delta y_n) \qquad (8)$$

In equation (8), the value $\alpha(m,n)$ is a weighting factor for each of the multiple pixels ($x_m, y_n$) in a previous frame $F_i$ that are mapped to a single pixel (x, y) in the current frame $F_j$.

The barbell lifting scheme can improve motion prediction. FIG. 9(*d*) shows a scenario in which a barbell function uses motion vectors associated with pixels around a pixel, (x,y), in a current frame, $F_j$, to obtain multiple predictions from the previous frame, $F_i$, and generate a new prediction. Not only is motion vector ($\Delta x_0, \Delta y_0$) used, but also motion vectors of neighboring pixels or blocks. An exemplary barbell function is shown in equation (9):

$$f = \sum_{m=0,\pm 1} \sum_{n=0,\pm 1} \alpha(m, n) F_i(x + \Delta x_m, y + \Delta y_n) \qquad (9)$$

In equation (9), the values m and n take on all possible combinations of 0, 1, and −1. The value $\alpha(m,n)$ is a weighting factor. Although equation (9) describes a scenario involving eight neighboring pixels, the barbell function is not limited to eight neighboring pixels. Indeed, the barbell function specified in equation (9) can be extended to more general cases, such as less or more than eight neighboring pixels.

Figure 10:
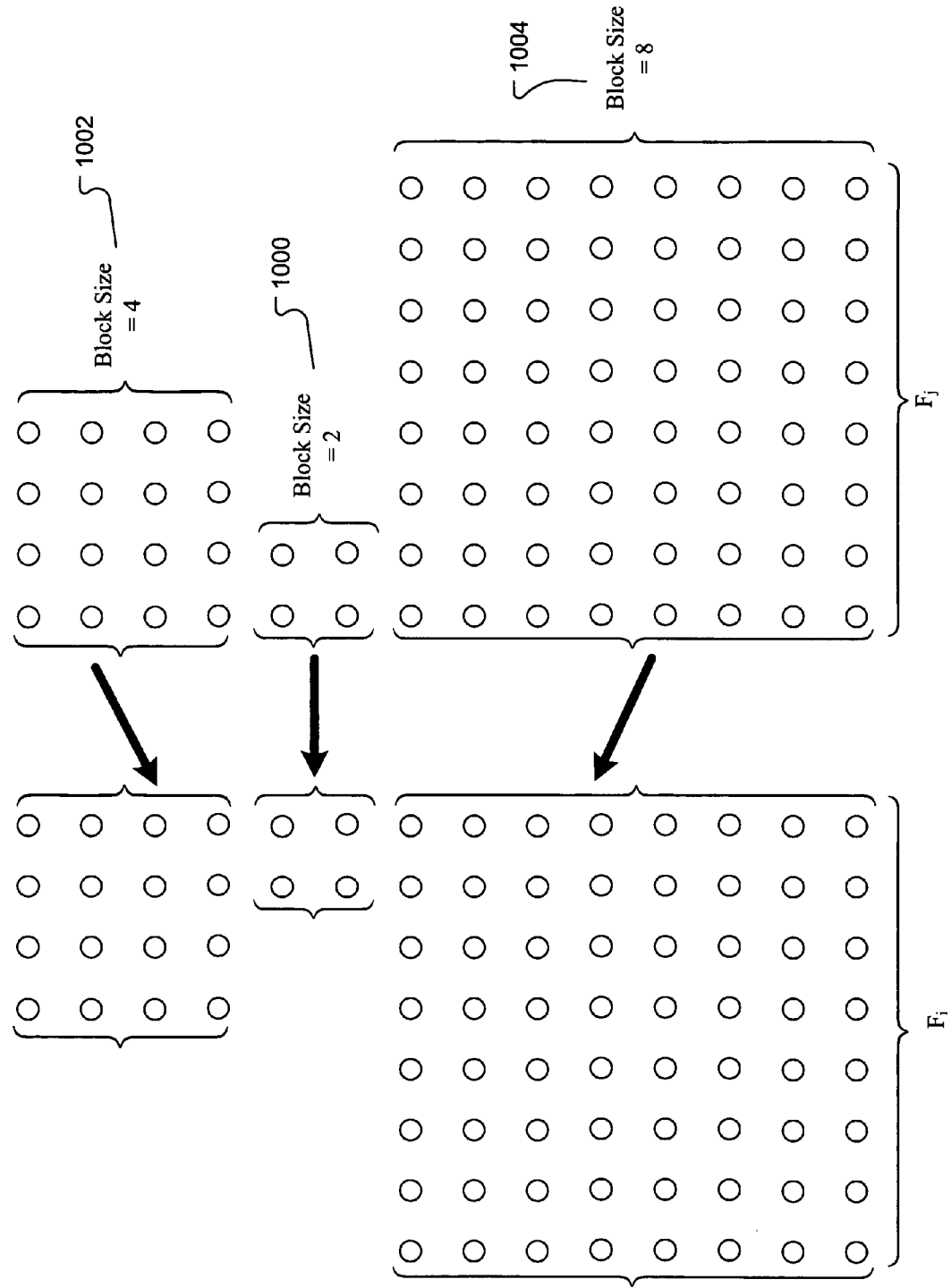
FIG. 10 illustrates various exemplary blocks of pixels, each having a different block size, to which the Barbell lifting can be applied.

In addition, the barbell lifting scheme can be applied with adaptive block size motion alignment as shown in FIG. 10. In this implementation, the same barbell function is applied to a block of pixels, which can reduce overhead associated with the barbell functions. The block sizes can be adapted to different regions in a video frame. FIG. 10 illustrates pixels in a current frame $F_j$ as they relate to pixels in a previous frame $F_i$. As shown, pixels can be grouped into blocks of various sizes, such as, but not limited to, a block size of two (1000), four (1002), or eight (1004) pixels. In one implementation of a temporal wavelet coder, the barbell lifting function is applied over a large block size in the flat regions of video and applied over small block size in complex regions.

Referring again to FIG. 9, as depicted in FIGS. 9(*b*) and (*c*), when pixels in different frames are aligned with motion vectors at fractional-pixel precision or with multiple-to-one pixel mapping, the prediction and update stages may have mismatch. Preferably, the update and prediction stages use the same motion vector(s) in order to save overhead bits to code motion vectors. The motion vector of the update stage is the inverse of the motion vector at the prediction stage, i.e., the same value but reverse direction.

Figure 11:
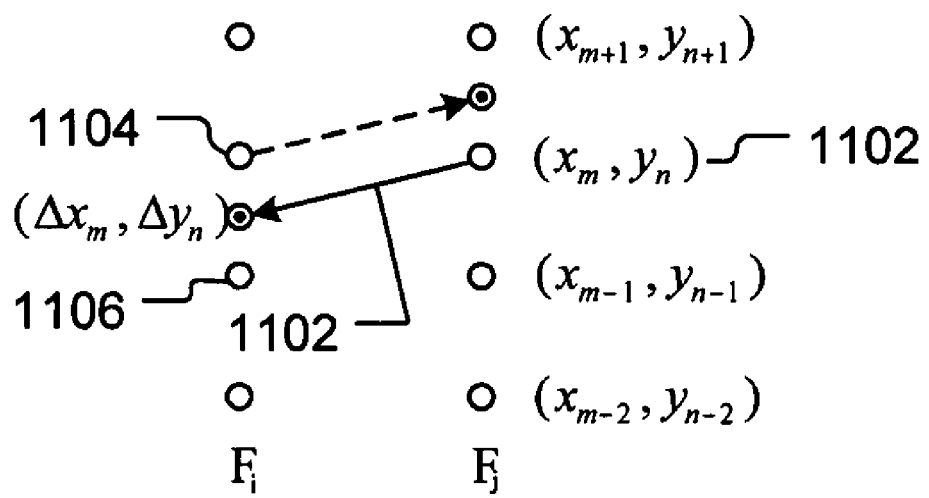
FIG. 11 illustrates a pixel mismatch problem that can arise with motion alignment.

FIG. 11 depicts an exemplary mismatch scenario. For example, the motion vector $(\Delta x_m, \Delta y_n)$ 1100 of pixel $F_j(x_m, y_n)$ 1102 points to a fractional location in frame $F_i$. Assuming linear interpolation is applied, it means that the prediction of pixel $F_j(x_m, y_n)$ 1102 is the weighted average of pixel 1104 and pixel 1106. In the update stage, the motion vector of pixel 1104 has the same value and inverse direction of $(\Delta x_m, \Delta y_n)$ as shown by the arrow with dashed line in FIG. 11. Therefore, pixel 1104 is updated with the predicted results of $F_j(x_m, y_n)$ and $F_j(x_{m+1}, y_{n+1})$. The mismatch is that the prediction has the path from pixel 1106 to $F_j(x_m, y_n)$ but the update has the path from $F_j(x_{m+1}, y_{n+1})$ to pixel 1104

The barbell lifting process can solve this problem. In the update stage the high-pass coefficients are distributed to those pixels that are used to calculate the high-pass coefficients in the prediction stage. Combining equations (2) and (8), the high-pass coefficient is obtained as follows:

$$h_j(x, y) = F_j(x, y) + \sum_i \sum_m \sum_n a_i \alpha_{i,j}(x, y, m, n) F_i(x + \Delta x_m, y + \Delta y_n) \quad (10)$$

The value $\alpha_{i,j}(x,y,m,n)$ is the barbell parameter specified by the coordination x, y, m, n. The low-pass coefficient is calculated as follows:

$$l_i(x, y) = F_i(x, y) + \sum_j \sum_m \sum_n b_j \alpha_{i,j}(x, y, m, n) h_j(x + \Delta x_m, y + \Delta y_n) \quad (11)$$

This means that the high-pass coefficient will be added exactly to the pixels they predict. For the above example, the predicted weight from pixel 1106 to $F_j(x_m, y_n)$ is non-zero. Therefore, the update weight from $F_j(x_m, y_n)$ to pixel 1106, which equals the predict weight, is also non-zero. This process eliminates mismatch between the prediction stage and the update stage. The barbell lifting process corresponding to the equations (10) and (11) is depicted in FIG. 12.

Figure 12:
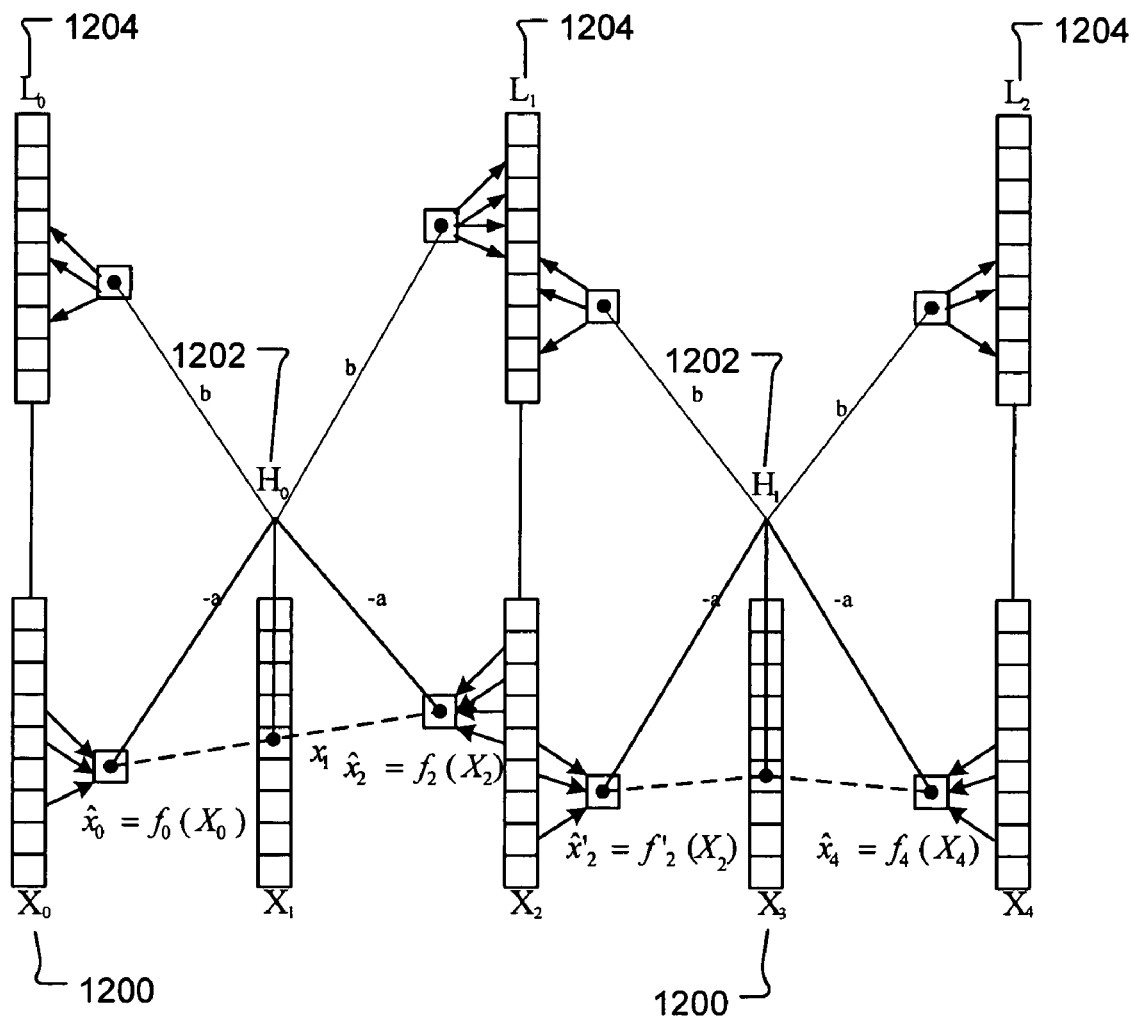
FIG. 12 illustrates an exemplary wavelet lifting scheme with barbell functions, which can solve the mismatch problem of FIG. 11.

FIG. 12 illustrates a sequence of 1-D pixel arrays 1200 that are barbell lifted to high-pass coefficient arrays 1202 and low-pass coefficient arrays 1204. Using equation (10) to obtain the high-pass coefficients and equation (11) to obtain the low-pass coefficients, the prediction and update stages are consistent. The new update stage avoids the need to derive inverse motion vectors. Therefore, the proposed technique preserves the operations, while avoiding ambiguity in the update stage.

Exemplary Operations

Described herein are exemplary methods for barbell lifting for video coding. The methods described herein may be embodied as logic instructions on one or more computer-readable medium. When executed on a processor, the logic instructions cause a general purpose computing device to be programmed as a special-purpose machine that implements the described methods. In the following exemplary operations, the components and connections depicted in the figures may be used to implement lifting for video coding.

Figure 13:
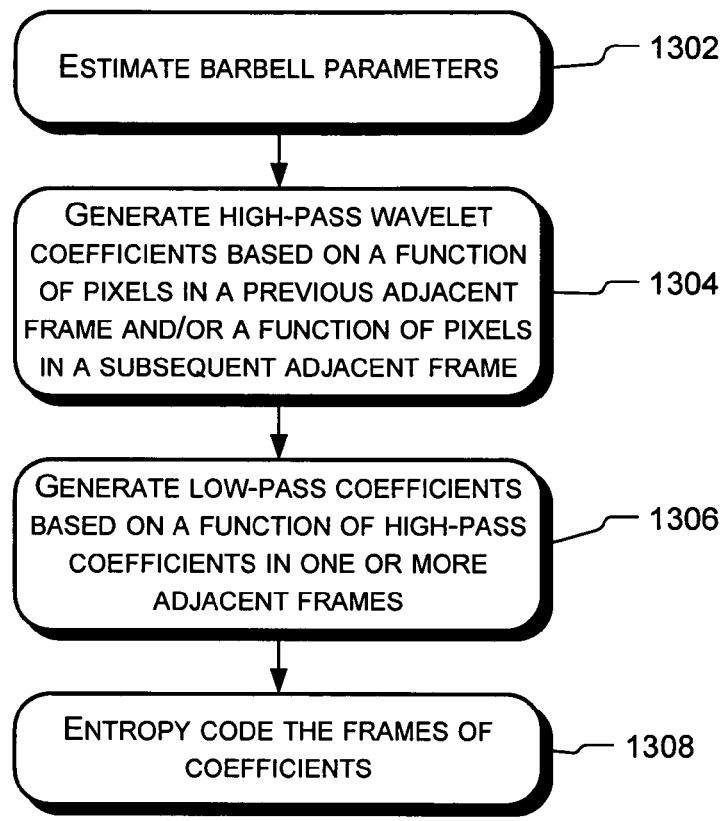
FIG. 13 is a flow chart illustrating an exemplary algorithm for coding video data using barbell lifting.

FIG. 13 illustrates an exemplary enhanced wavelet lifting algorithm 1300 for coding video data using barbell lifting. A video coder, such as the video coder shown in FIG. 2, can execute the operations shown in the algorithm 1300. It is assumed that a sequence of video frames is input to the video coder.

An estimating operation 1302 estimates barbell lifting parameters. In one implementation, when the barbell lifting function is used for motion alignment, the estimating operation 1302 estimates the motion data (e.g., motion vectors, coding modes and interpolation). In this implementation, the motion data are estimated in either of frame, group of macroblocks, macroblock and block.

In another implementation of the estimating operation 1302, when the barbell lifting function is used for spatial prediction, the prediction data (prediction directions, coding modes and interpolation) are estimated. In this implementation, the prediction data are estimated in either of frame, group of macroblocks, macroblock and block.

The estimated parameters generated by the estimating operation 1302 are used in the barbell lifting functions of the barbell lifting process to decompose the input video signal into low-pass and high-pass coefficients. The barbell lifting process includes two stages: a prediction stage, and an update stage. The prediction stage is embodied in a first generating operation 1304, and the update stage is embodied in another generating operation 1306.

The first generating operation 1304 generates high-pass wavelet coefficients based on a function of pixels in the previous adjacent frame and a function of pixels in a subsequent adjacent frame. High-pass coefficients are generated for every other frame in a frame sequence. Typically, high-pass coefficients are generated for the odd frames in the sequence. The functions of the pixels in adjacent frames may be linear, or non-linear. Exemplary functions are shown and described above. A discrete wavelet transform is applied iteratively for each pixel in the frame, including the barbell functions, to generate the high-pass frame.

The second generating operation 1306 generates low-pass wavelet coefficients based on a function of high-pass coefficients in one or more adjacent frames. The low-pass coefficients are generated for the frames for which high-pass coefficients were not generated. Typically, low-pass coefficients are generated for the even frames in the sequence. The function of high-pass coefficients may be linear or non-linear. Exemplary barbell functions are shown and described above. A discrete wavelet transform is performed over the functions of high-pass coefficients and each pixel in the frame to generate a frame of low-pass coefficients.

The estimated parameters and the decomposed coefficients are input to an entropy coding operation 1308. The entropy coding operation 1308 applies an entropy coding algorithm, such as Fibonacci coding, Golomb coding, Rice coding, Huffman coding, or Range coding. The algorithm performed by the entropy coding operation 1308 compresses the data even more, by assigning the most common data symbols to the shortest codes.

Figure 14:
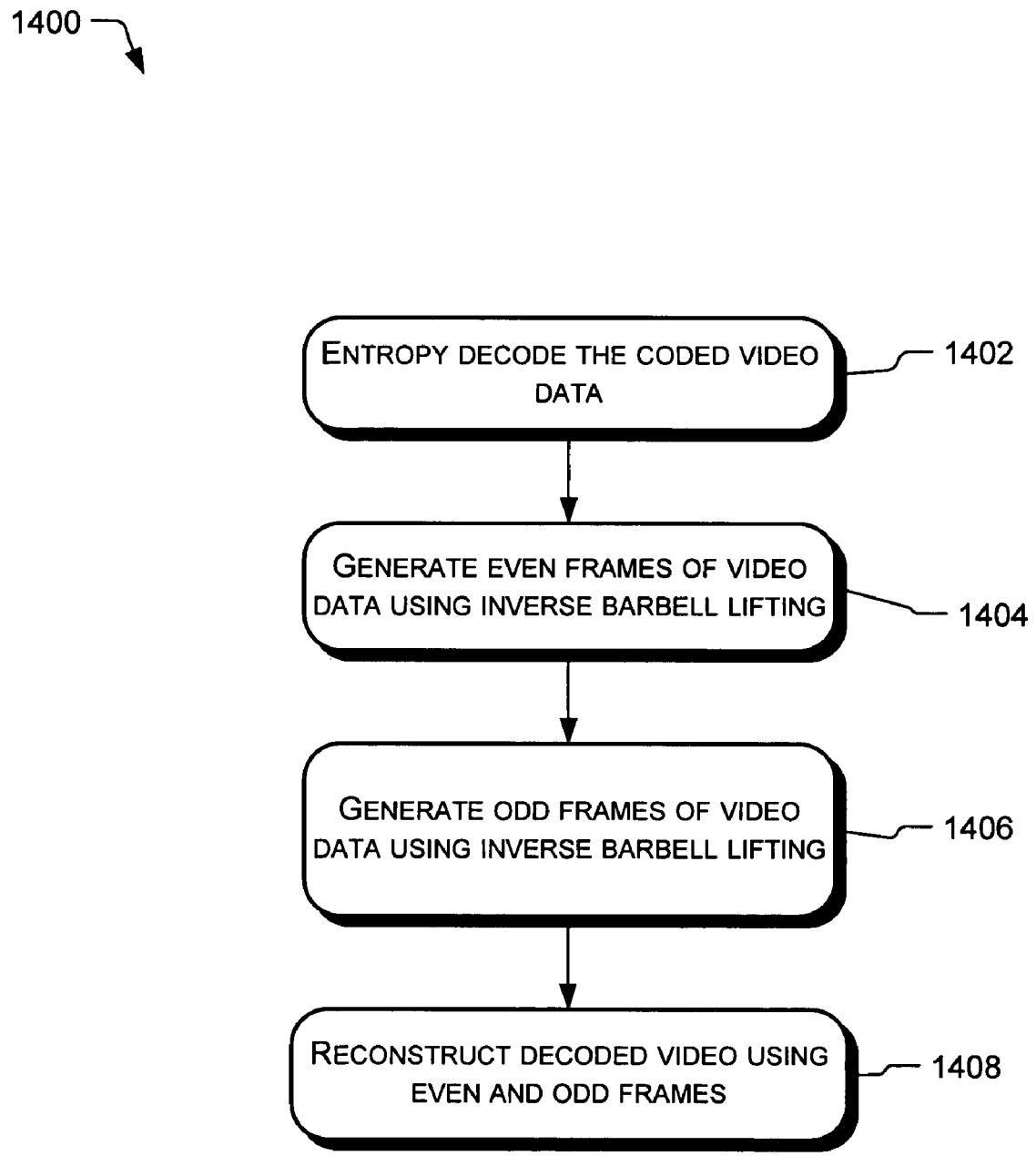
FIG. 14 is a flow chart illustrating an exemplary algorithm for decoding frames of data that has been coded using barbell lifting.

FIG. 14 illustrates an exemplary decoding algorithm 1400 for decoding coded video data that is coded using barbell lifting. Typically, the decoding algorithm 1400 is performed by a decoder executing as part of a video receiver. It is assumed that the input to the decoding algorithm 1400 is a signal containing frames that have been encoded using barbell lifting as described above.

An entropy decoding operation 1402 entropy decodes the received barbell lifting coded frames. The entropy decoding operation 1402 performs substantially the inverse of operation 1308 (FIG. 3). The output of the entropy decoding operation 1402 is a sequence of alternating low-pass and high-pass frames.

A generating operation 1404 generates even frames of video data using inverse barbell lifting. Each pixel in the even frames is generated by performing an inverse wavelet transform on a combination of high-pass coefficients in one or more adjacent frames and a corresponding low-pass coefficient. A barbell function that was used in the coding process is applied to the high-pass coefficients and input to the inverse wavelet transform. The even frames of video data are generated by performing the generating operation 1404 for all pixels in the even frames.

Another generating operation 1406 then generates the remaining frames of video data using inverse barbell lifting. Each pixel in an odd frame is generated by performing an inverse wavelet transform on a combination of pixels in adjacent video frames and a corresponding high-pass coefficient. A barbell function that was used in the coding process is applied to the pixels in the adjacent video frame and input to the inverse wavelet transform. The odd frames of video data are generated by performing the generating operation 1406 for all pixels in the odd frames.

A reconstructing operation 1408 reconstructs the original video using the even and odd decoded video frames. The reconstructing operation 1408 puts the decoded video frames in order and prepares them for storage or presentation.

Exemplary Computing Device

Figure 15:
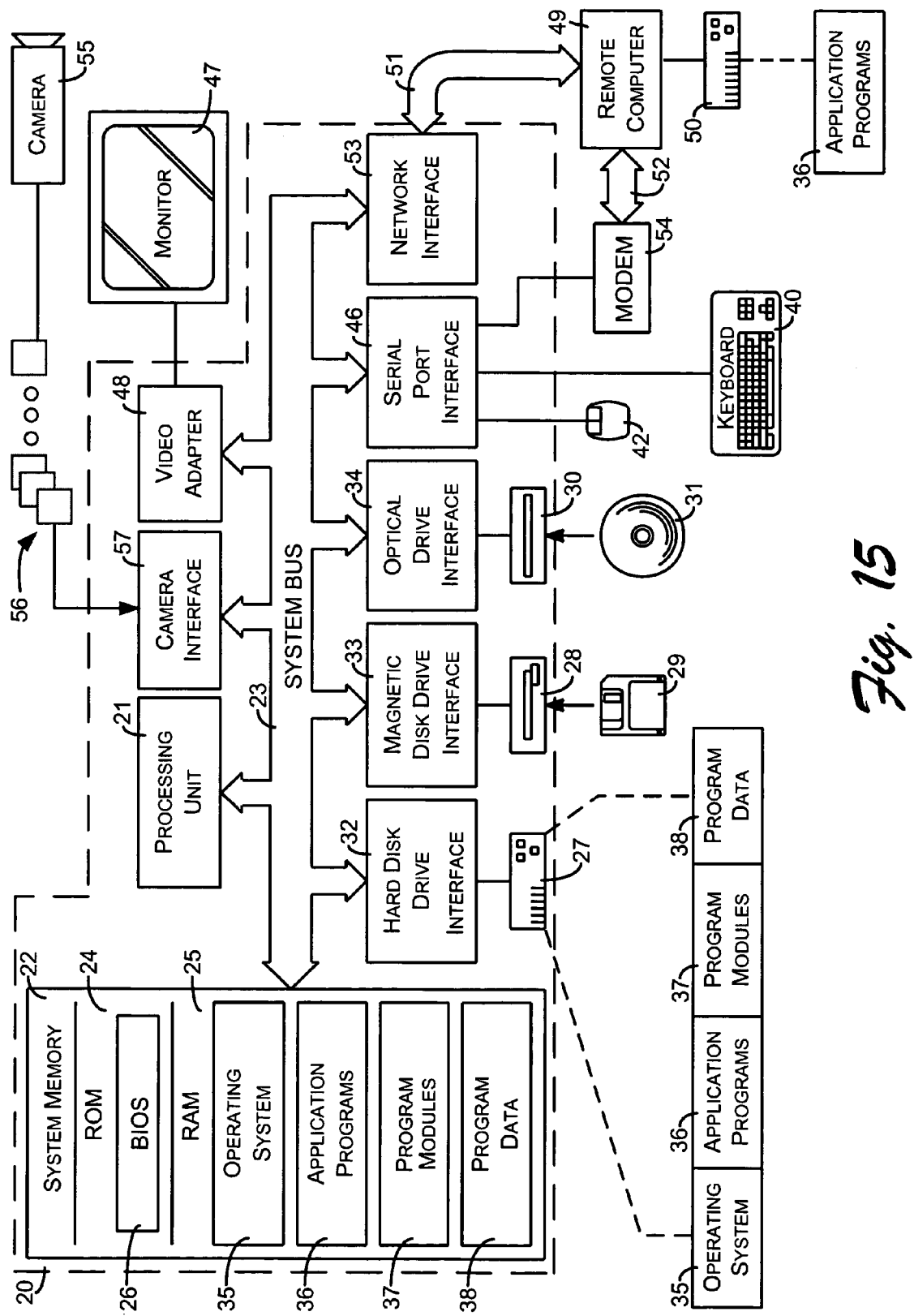
FIG. 15 illustrates a general purpose computer that can be used to implement barbell lifting to code and decode video.

With reference to FIG. 15, an exemplary system for implementing the operations described herein includes a general-purpose computing device in the form of a conventional personal computer 20, including a processing unit 21, a system memory 22, and a system bus 23. System bus 23 links together various system components including system memory 22 and processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system 26 (BIOS), containing the basic routine that helps to transfer information between elements within the personal computer 20, such as during start-up, is stored in ROM 24.

As depicted, in this example personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM, DVD, or other like optical media. Hard disk drive 27, magnetic disk drive 28, and optical disk drive 30 are connected to the system bus 23 by a hard disk drive interface 32, a magnetic disk drive interface 33, and an optical drive interface 34, respectively. These exemplary drives and their associated computer-readable media provide nonvolatile storage of computer readable instructions, data structures, computer programs and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs), read only memories (ROMs), and the like, may also be used in the exemplary operating environment.

A number of computer programs may be stored on the hard disk, magnetic disk 29, optical disk 31, ROM 24 or RAM 25, including an operating system 35, one or more application programs 36, other programs 37, and program data 38. A user may enter commands and information into the personal computer 20 through input devices such as a keyboard 40 and pointing device 42 (such as a mouse).

Of particular significance to the present invention, a camera 55 (such as a digital/electronic still or video camera, or film/photographic scanner) capable of capturing a sequence of images 56 can also be included as an input device to the personal computer 20. The images 56 are input into the computer 20 via an appropriate camera interface 57. In this example, interface 57 is connected to the system bus 23, thereby allowing the images to be routed to and stored in the RAM 25, or one of the other data storage devices associated with the computer 20. It is noted, however, that image data can be input into the computer 20 from any of the aforementioned computer-readable media as well, without requiring the use of the camera 55.

Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, a universal serial bus (USB), etc.

A monitor 47 or other type of display device is also connected to the system bus 23 via an interface, such as a video adapter 48. In addition to the monitor, personal computers typically include other peripheral output devices (not shown), such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the personal computer 20.

The logical connections depicted in FIG. 15 include a local area network (LAN) 51 and a wide area network (WAN) 52. Such networking environments are commonplace in offices, enterprise-wide computer networks, Intranets and the Internet.

When used in a LAN networking environment, personal computer 20 is connected to local network 51 through a network interface or adapter 53. When used in a WAN networking environment, the personal computer 20 typically includes a modem 54 or other means for establishing communications over the wide area network 52, such as the Internet. Modem 54, which may be internal or external, is connected to system bus 23 via the serial port interface 46.

In a networked environment, computer programs depicted relative to personal computer 20, or portions thereof, may be stored in a remote memory storage device. It will be appreciated that the network connections shown are exemplary and other means of establishing a communications link between the computers may be used.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information and which can be accessed by a computer.

"Communication media" typically embodies computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

Although the exemplary operating embodiment is described in terms of operational flows in a conventional computer, one skilled in the art will realize that the present invention can be embodied in any platform or environment that processes and/or communicates video signals. Examples include both programmable and non-programmable devices such as hardware having a dedicated purpose such as video conferencing, firmware, semiconductor devices, hand-held computers, palm-sized computers, cellular telephones, and the like.

Although some exemplary methods and systems have been illustrated in the accompanying drawings and described in the foregoing Detailed Description, it will be understood that the methods and systems shown and described are not limited to the particular implementation described herein, but rather are capable of numerous rearrangements, modifications and substitutions without departing from the spirit set forth herein.

What is claimed is:

1. A method for encoding motion-compensated video data comprising generating, for a current frame, a high-pass wavelet coefficient based on a non-linear function of one or more pixels in a temporally adjacent frame, the function being of the form:

$$f = \sum_m \sum_n \beta(m, n) F_i(x + \lfloor \Delta x_m \rfloor + m, y + \lfloor \Delta y_n \rfloor + n),$$

wherein $f$ represents the result of the function, $\beta(m,n)$ represents an interpolation factor applied to a pixel in the temporally adjacent frame, the pixel in the temporally adjacent frame being identified by m and n, $F_i$ denotes the temporally adjacent frame, (x,y) represents coordinates of a pixel in the current frame corresponding to the high-pass wavelet coefficient, $(\Delta x_m, \Delta y_n)$ represents the motion vector relating the pixel (x,y) in the current frame to the pixel in the temporally related frame, and $\lfloor \Delta x_m \rfloor$ and $\lfloor \Delta y_n \rfloor$ represent integer parts of $\Delta x_m$ and $\Delta y_n$, respectively.

2. A method as recited in claim 1 further comprising repeating the generating operation for each of a plurality of pixels in a pixel array in the current frame to form a corresponding array of high-pass wavelet coefficients.

3. A method as recited in claim 2 further comprising generating a low-pass wavelet coefficient based on a function of one or more high-pass wavelet coefficients.

4. A method as recited in claim 2 wherein the generating operation comprises applying a wavelet transform of the form:

$$h_1 = a \times \hat{s}_0 + s_1 + b \times \hat{s}_2,$$

wherein $h_1$ represents the high-pass wavelet coefficient, a and b each represent a filtering parameter, $s_1$ represents a pixel corresponding to $h_1$, $\hat{s}_0$ represents a function of one or more pixels in a first temporally adjacent frame and $\hat{s}_2$ represents a function of one or more pixels in a second temporally adjacent frame.

5. A method as recited in claim 3 wherein the generating a low-pass coefficient comprises applying a wavelet transform of the form:

$$l_1 = a \times \hat{h}'_0 + x_2 + b \times \hat{h}_1,$$

wherein $l_1$ represents the low-pass wavelet coefficient, a and b each represent a filtering parameter, $x_2$ represents a pixel corresponding to $l_1$, $\hat{h}'_0$ represents a function of a set of the high-pass coefficients and $\hat{h}'_1$ represents a function of another set of the high-pass coefficients.

6. A method as recited in claim 1 wherein the function of the one or more pixels in the temporally adjacent frame is a linear function.

7. A method as recited in claim 1 further comprising generating motion vectors indicating motion of pixels in the current frame to the temporally adjacent frame.

8. A method as recited in claim 1, wherein the generating operation comprises adaptively applying a barbell function to pixel arrays having different sizes.

9. A method as recited in claim 1, further comprising repeating the generating operation for each of a plurality of pixels in a pixel array in the current frame, and wherein the function is different for at least two repetitions of the generating operation.

10. A computer program product encoding a computer program for executing a computer process on a computer system stored on a computer storage media, the computer process comprising generating a high-pass wavelet coefficient and a motion vector corresponding to a pixel in a current frame, the high-pass wavelet coefficient being a combination of the corresponding pixel and a function of at least one pixel in a previous adjacent frame, the function being of the form:

$$f = \sum_m \sum_n \beta(m, n) F_i(x + \lfloor \Delta x_m \rfloor + m, y + \lfloor \Delta y_n \rfloor + n),$$

wherein $f$ represents the result of the function, $\beta(m,n)$ represents an interpolation factor applied to a pixel in the temporally adjacent frame, the pixel in the temporally adjacent frame being identified by m and n, $F_i$ denotes the temporally adjacent frame, (x,y) represents coordinates of a pixel in the current frame corresponding to the high-pass wavelet coefficient, $(\Delta x_m, \Delta y_n)$ represents the motion vector relating the first pixel (x,y) in the current frame to the pixel in the temporally related frame, and $\lfloor \Delta x_m \rfloor$ and $\lfloor \Delta y_n \rfloor$ represent integer parts of $\Delta x_m$ and $\Delta y_n$, respectively.

11. A computer program product as recited in claim 10 wherein the high-pass coefficient is further a function of at least one pixel in a subsequent adjacent frame.

12. A computer program product as recited in claim 10, the computer process further comprising:
repeating the generating operation for each pixel in a first block of pixels in the current frame, the first block having a first block size;
repeating the generating operation for each pixel in a second block of pixels in the current frame, the second block having a second block size different from the first block size.

13. A computer program product as recited in claim 10, the computer process further comprising:
repeating the generating operation for a plurality of pixels in the current frame to generate a plurality of high-pass wavelet coefficients;
generating a low-pass wavelet coefficient corresponding to a pixel in the previous adjacent frame, the low-pass wavelet coefficient being a combination of the corresponding pixel in the previous adjacent frame, and a function of at least one of the plurality of high-pass wavelet coefficients.

14. A computer program product as recited in claim 10 wherein the function of at least one pixel in the previous adjacent frame is a linear function.

15. A computer program product as recited in claim 10 wherein the function comprises a linear interpolation of at least two pixels in the previous adjacent frame.

16. A computer program product as recited in claim 10 wherein the function comprises a weighted average of at least two pixels in the previous adjacent frame.

17. A computer program product as recited in claim 10 wherein the generating operation further comprises adaptively applying the function to pixel blocks having different sizes.

18. A method as recited in claim 10 wherein the generating a high-pass wavelet coefficient is performed during a prediction stage and the generating a low-pass wavelet coefficient is performed in an update stage.

19. A method as recited in claim 18 further comprising eliminating mismatch related to motion alignment between the prediction stage and the update stage.

20. A system comprising:
a temporal wavelet decomposition module decomposing pixels of a current frame into high-pass coefficients, the decomposing comprising, for each pixel, performing a discrete wavelet transform on the pixel, a function of at least one pixel in a previous frame and at least one pixel in a subsequent frame, the function being of the form:

$$f = F_i(x + \Delta x, y + \Delta y),$$

wherein $(\Delta x, \Delta y)$ represents the motion vector associated with a pixel $(x, y)$ in the current frame, and $F_i$ denotes the previous frame; and
a motion estimation module generating motion vectors associated with the at least one pixel in the previous frame and the at least one pixel in the subsequent frame.

21. A system as recited in claim 20 wherein the function of at least one pixel in the previous frame comprises a function of the motion vectors.

22. A system as recited in claim 20 wherein the function of at least one pixel in the previous frame comprises a linear interpolation of two or more of a plurality of pixels in the previous frame.

23. A system as recited in claim 20 wherein the function of the at least one pixel in the previous frame is a non-linear function.

24. A system as recited in claim 20 wherein the temporal wavelet decomposition module generates frames of wavelet coefficients, the frames alternating between frames of low-pass coefficients and frames of high-pass coefficients.

25. A system as recited in claim 20 wherein the temporal wavelet decomposition module decomposes a pixel in the previous frame into a low-pass coefficient based on a plurality of the high-pass coefficients.

26. A system as recited in claim 25 wherein the temporal wavelet decomposition module decomposes pixels of a current frame into high-pass coefficients in a prediction stage and decomposes a pixel in the previous frame into a low-pass coefficient in an update stage.

27. A system as recited in claim 26 wherein the temporal wavelet decomposition module eliminates mismatch between the update stage and the prediction stage.

* * * * *